United States Patent
Lanza et al.

[19]

[11] Patent Number: 5,938,710
[45] Date of Patent: Aug. 17, 1999

[54] SELECTIVELY OPERABLE INDUSTRIAL TRUCK

[75] Inventors: Fabrizio Lanza, Cernusco Sul Naviglio; Guido Livon, Latisana; Stefano Masciangelo, Genoa; Marco Ilic, Reggio Emilia; Paolo Bassino, Savona; Giovanni Garibotto, Varazze, all of Italy

[73] Assignees: Fiat Om Carrelli Elevatori S.p.A.; Consorzio Telerobot, both of Italy

[21] Appl. No.: 08/832,212

[22] Filed: Apr. 3, 1997

[51] Int. Cl.⁶ .................................. G06F 7/00; B66F 9/20
[52] U.S. Cl. .............................. 701/50; 701/25; 701/28; 187/224; 187/231; 180/169; 414/274
[58] Field of Search ................................. 701/50, 23, 24, 701/25, 26, 28; 364/167.02, 528.37; 180/211, 411, 168, 169, 266, 291; 187/224, 222, 226, 234, 237, 231; 414/633, 274, 273, 632, 671, 635, 347, 417

[56] References Cited

U.S. PATENT DOCUMENTS

| | | | |
|---|---|---|---|
| 4,279,328 | 7/1981 | Ahlbom | 187/224 |
| 4,287,966 | 9/1981 | Frees | 187/231 |
| 4,365,921 | 12/1982 | Brouwer et al. | 414/347 |
| 4,520,903 | 6/1985 | Arnold et al. | 187/222 |
| 4,714,399 | 12/1987 | Olson | 414/621 |
| 4,869,635 | 9/1989 | Krahn | 414/274 |
| 4,917,649 | 4/1990 | Tammera | 446/427 |
| 5,208,753 | 5/1993 | Acuff | 701/50 |

FOREIGN PATENT DOCUMENTS

| | | |
|---|---|---|
| 335196 | 10/1989 | European Pat. Off. . |
| 3037221 | 8/1982 | Germany . |
| 3606418 | 8/1987 | Germany . |
| 2131574 | 6/1984 | United Kingdom . |

OTHER PUBLICATIONS

Sensory Based Capabilities in Guided Vehicles for Factory Automation, P J Probert et al., May 1991, pp. 615–622.

A Camera Space Control System for an Automated Forklift, R.K. Miller et al., Oct. 5, 1994, pp. 710–716.

*Primary Examiner*—Jacques H. Louis-Jacques
*Attorney, Agent, or Firm*—Webb Ziesenheim Logsdon Orkin & Hanson, P.C.

[57] ABSTRACT

An industrial truck, in particular a counterbalanced front-forklift truck, is provided which can be operated both manually and automatically and has a fork to handle pallets and loads located thereon. The forklift truck is equipped for automatic operation with a control system which can be brought into active connection with the vehicle drive system, the vehicle steering system, the vehicle braking system or the movement control system for the fork. The truck further includes a system for the input and storage of possible travel routes and a transport task, a system for the autonomous determination of the position of the vehicle in the room, a system for the control of the movement of the vehicle as a function of its position in the room and of the predefined transport task, a system for detection of the presence, the position, and the orientation of a pallet, a system for the control of the movement of the fork and/or of the vehicle as a function of the position, the orientation of the pallet, and the transport task, and a system for the deceleration of the vehicle in the presence of obstacles.

23 Claims, 11 Drawing Sheets

DATA CALCULATED FROM STEP 1 AND 2

OPTIMIZATION OF FREE PARAMETERS WHICH MINIMIZE
THE ERROR FUNCTION USING
THE LEVENBERG-MARQUARDT ALGORITHM

HAS THE ALGORITHM IDENTIFIED A SOLUTION ? — NO →

YES

MEMORIZING THE SOLUTION AS EFFECTIVE MODEL PARAMETERS

SUCCESSFUL CONCLUSION

UNSUCCESSFUL CONCLUSION
REPEAT CALIBRATION

STEP 3: CALCULATION OF CALIBRATION PARAMETERS

FIG. 11b

SELECTIVELY OPERABLE INDUSTRIAL TRUCK

BACKGROUND OF THE INVENTION

1. Field of the Invention

The invention relates generally to industrial trucks and, more particularly, to a counterbalanced forklift truck which can be selectively operated either manually or automatically and which is provided with a fork to handle loaded pallets.

2. Description of the Prior Art

A generic industrial truck designed as a forklift truck is disclosed in German reference DE 36 06 418. However, no detailed disclosure of the functioning of this vehicle in automatic operation is found in the DE 36 06 418 reference. So-called "driverless transport systems" are known in the art. One example of such a driverless transport system is an automatic shelf loader in which a picked up load can be moved both vertically and horizontally. The known driverless transport systems are preferably program controlled. For such control, the load to be picked up must always be placed exactly in a specific spatial position. With regard to the specific route to be traveled by a driverless industrial truck, systems in which the vehicle is guided along a track are typically used.

As a rule, such driverless transport systems are controlled by a central computer. The central computer may control the vehicle remotely with the cooperation of an on-board computer, for example, by means of radio data transmission. Driverless transport systems require a high construction outlay. In addition, because of their design and control-technology orientation, driverless transport systems are not universally usable, in contrast to conventional forklift trucks.

Therefore, it is an object of the present invention to provide an industrial truck which can, with minimal expense, be operated both manually and automatically.

SUMMARY OF THE INVENTION

The above object is accomplished according to the invention in that the vehicle, for example an industrial truck, is equipped with a control system which can be brought into active connection with the truck drive system, the truck steering system, the truck braking system or the movement control system for the fork. The industrial truck has means for the input and storage of possible travel routes and a transport task, means for the autonomous determination of the position of the vehicle in a room, means for control of the movement of the vehicle as a function of its position in the room and of the predefined transport task, means for detection of the presence, the position, and the orientation of a pallet, means for control of the movement of the fork and/or of the vehicle as a function of the position, the orientation of the pallet, and the transport task and means for deceleration of the vehicle in the presence of obstacles.

The truck of the invention provides substantially the sensory capability and on-board intelligence typically required of a human driver without substantially altering the conventional driving controls, such as the pedal accelerator, emergency brake and steering wheel control of the truck.

The industrial truck designed according to the invention is capable of navigating freely in a room by means of its own on-board control system. As a function of the predefined transport task and the determined position of the vehicle in the room, the control system determines a suitable route among the stored travel routes and guides the industrial truck along this route.

Moreover, in contrast to the prior art driverless transport systems, the pallet to be handled or the load located on the pallet need not be placed precisely in a specific position in the room in advance since the control system detects the position of the pallet and adapts the sequence of movements of the fork and/or of the industrial truck appropriately, according to the predefined transport task, for pickup of the pallet.

The industrial truck according to the invention is consequently capable of autonomously undertaking transport and warehousing tasks, whereby there is no need for control via an external master monitor or central unit. The industrial truck is consequently ideally suited for the warehousing and the rearranging of loads which can be stacked using pallets. Typical situations for this are in the area between the end of a production line and a warehouse as well as the area between the warehouse and the consignment zone, in which, for example, the loads are prepared for loading onto a truck.

According to the invention, the control system is designed for automatic management of the movements of pallets which are stacked on top of each other in a plurality of levels. The automatic control system is configured to reversibly engage and control the truck brake system, truck steering system, truck drive system and the fork movement control system.

The transport task can usually be transcribed as a sequence of commands, such as:

Definition of the stack (identifiable, for example, by an identification number) from which pallets with loads are to be picked up;

Quantity of pallets to be picked up and transported (in succession);

Starting status of the stack (e.g., how many stacked levels, where is the first pallet to be loaded located, etc.);

Definition of the destination(s) and their identification numbers;

Starting status of the destination;

Quantity of pallets to be transported to the individual destinations;

This is the same type of information that the driver of a manually operated industrial truck also needs.

Besides the fully automatic operation, it is also possible for the industrial truck according to the invention to be operated manually by a driver in the conventional manner. Thus, the industrial truck according to the invention is designed as a conventional counterbalanced forklift truck which can be used manually, for example, in the event of a malfunction caused by an unforeseen obstacle. All that is required is the activation of a change-over element to switch between automatic and manual operation.

An advantageous embodiment of the invention provides that the means for autonomous determination of the vehicle's position in the room includes an odometry system and an image processing system with at least one navigation camera. Such a system enables very accurate determination of the position of the forklift truck in the room.

Odometric sensors disposed on the drive wheels and/or the steered wheel of the industrial truck deliver measured values from the starting point of the industrial truck. By use of these measured values, the position of the truck is calculated. A gyroscope may also be used to detect the angular deviations of the vehicle from a starting position.

For increased accuracy in position determination, an optical position determination system using geometric markings detectable by a navigation camera may be used. An example of such a system is disclosed in European Patent Application 95202636.8, which is herein incorporated by reference. This system is also described hereinbelow.

Preferably, the navigation camera used in the present invention is disposed on the side of the industrial truck opposite the fork in an upper region of the truck, i.e., in the upper region of the roof protecting the driver in a counterbalanced forklift truck.

It is preferable if the means for detection of the presence, the position, and the orientation of a pallet includes an image processing system with at least one camera attached to the fork side of the industrial truck and configured to move with the fork. Thus, it is possible, with a relatively low cost, to obtain the information relative to the load to be handled, which is required for automatic operation. Such a system is based on the identification of the insertion openings for the prongs of the fork. One such system is disclosed in Italian Patent Application MI94A002321, which is herein incorporated by reference. This system is also discussed hereinbelow.

As soon as the pallet information required for the pickup of the load is present, the industrial truck is moved by the control system in the direction of the load, i.e., in the direction of the pallet on which the load is located. If necessary, appropriate alignment of the vehicle and horizontal and vertical alignment of the fork may be made.

To ensure that the pallet is properly picked up, at least one sensor connected to the control system (e.g., a microswitch or the like) may be provided for detection of a pallet disposed on the fork.

Since the camera which is movable with the fork has motion identical to that of the fork, it is blocked by the picked up load resting on the fork. As a result, it is advantageous if a sensor, in particular an ultrasound sensor connected to the automatic control system, is disposed on the fork side of the truck. This sensor is active at least while the load is raised. Using the sensor, the prongs can be inserted into the pallet without prior knowledge of the load position in the room and the load can be picked up or unloaded. It is possible by means of the sensor to calculate the available distance for pickup and/or unloading of the pallet, in particular, the distance to a wall or an already unloaded pallet. The pickup and/or unloading position is then determined using the measured odometric data.

Preferably, for automatic operation of the fork, odometric sensors are provided for determination of the position of the incline and/or the horizontal displacement and/or the lift of the fork.

In order to be able to also operate the fork manually in the simplest manner, a manually operated lever designed as a joystick, by means of which an incline function, a displacement function, and a lift function of the fork can be controlled, is provided for manual control of the fork.

When the industrial truck according to the invention is operated automatically, for safety reasons, no personnel should be in the vicinity of the truck or the load. However, to prevent collisions with people who nevertheless are in the area of movement of the industrial truck, sensors, in particular infrared sensors, connected to the control system are provided to determine the presence of obstacles or people along the route of travel.

Preferably, at least two spaced-apart infrared sensors are provided on both the front and the rear of the truck. Using these infrared sensors, it is possible to monitor a large area in both directions of travel. As soon as a person is detected by the infrared sensors, measures are taken to bring the industrial truck to a halt.

For emergencies, provision is advantageously made that in the event of disruptions of operation, a negative brake (a deadman brake) of the vehicle and/or a parking brake can be automatically activated.

Safety is further increased if a stop (i.e., a bumper), which is actively connected to at least the braking system, is installed on the end of the industrial truck away from the fork. Thus, automatic parking of the vehicle is possible by contact with a person or another obstacle.

If the control system has an I/O unit for input of commands, in particular a keyboard and a display as an operator interface, transport tasks can be defined very simply. It is also possible to program and to call up individual sequences of movements which can be automatically executed at a later time.

In order to be able to steer the industrial truck with minimum effort both manually and automatically, an actuator, which is controllable directly or indirectly by the control system, is provided to engage the steering system of the industrial truck during automatic operation. This may, for example, be an electric motor which is connected with a steering column of an industrial truck.

Additionally, it is advantageous if the control system in automatic operation is acted upon by an alternative speed signal instead of a manual speed signal generated in manual operation by a drive pedal. The optimum working speed of the industrial truck of the invention results from the fact that the vehicle speed can be controlled by the control system as a function of the curvature of the route traveled.

The industrial truck according to the invention can be designed not only as a conventional counterbalanced forklift truck, but also as any technical warehousing device. Additionally, it is also possible to use a "driverless transport system" or an industrial tractor as the basic device for the industrial truck according to the invention and to design it according to the invention.

In addition, for completely autonomous operation of the industrial truck according to the invention, such vehicles can also be used in fleet operation, i.e., guided by a central control unit.

Additional advantages and details of the invention are explained in more detail with reference to the exemplary embodiment depicted in the schematic figures.

DESCRIPTION OF THE PREFERRED EMBODIMENTS

Figure 1:
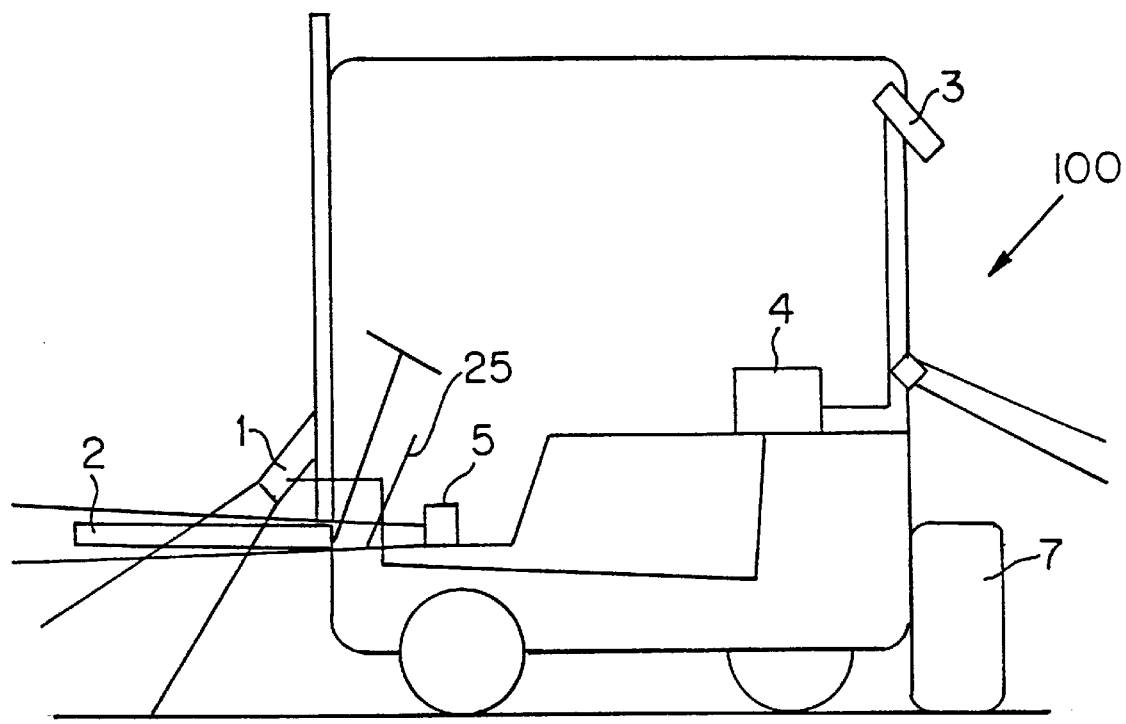
FIG. 1 is a side view of an industrial truck of the invention designed as a forklift truck.

For purposes of the description hereinafter, the terms "upper", "lower", "right", "left", "vertical", "horizontal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
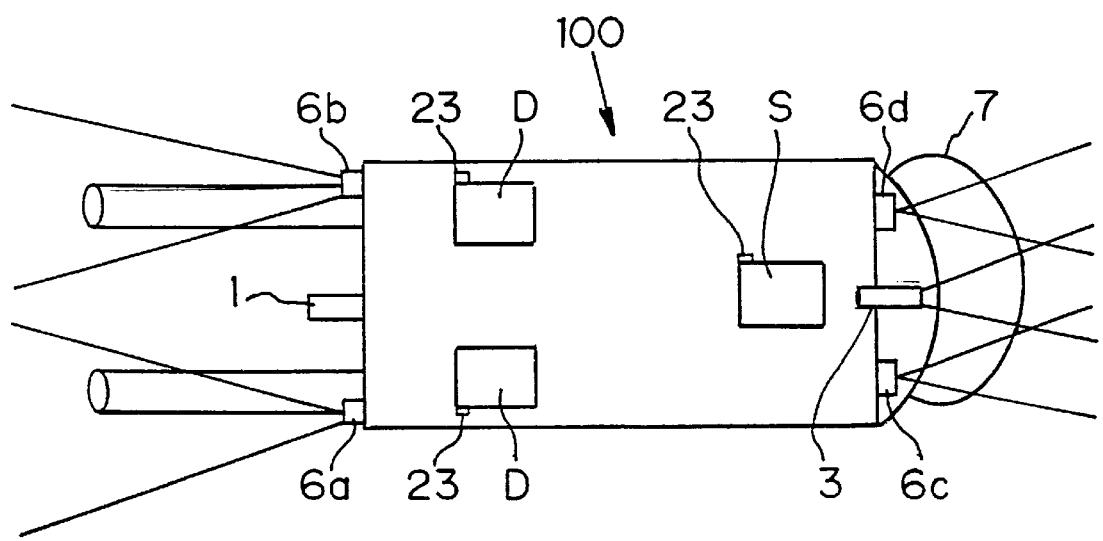
FIG. 2 is a plan view of the forklift truck of FIG. 1.

As shown in FIGS. 1 and 2, an industrial truck 100 according to the invention, which is designed in one exemplary embodiment as a forklift truck and is selectively operable either manually or automatically, has a first camera 1 which is attached to a movable fork 2 located on the front of the truck 100. The camera 1 is configured to move identically along with the fork 2 and serves to detect the presence, the position, and the orientation of a pallet. Using the camera 1, information with regard to the load to be handled which is essential for automatic operation is detected. For example, the prong insertion openings present on a pallet may be identified on the basis of this information. One such system for detecting pallet information is disclosed in Italian Patent Application MI94A002321, discussed hereinbelow.

A second or navigation camera 3 is located in the upper region of the truck 100 on the side of the truck 100 opposite the fork 2. The navigation camera 3 serves for the detection of the spatial position of the truck 100. Geometric markings (for example, H-shaped symbols, which are distributed in the space provided for the movement of the forklift truck) and characteristics of the surroundings are detected by the navigation camera 3 and are used, with the aid of an image processing system included in an automatic control system, for automatic determination of the vehicle position in the room.

Both cameras 1 and 3 are connected to an automatic control system 4 mounted on the truck 100. The control system 4 can be brought into active connection with the truck drive system, the truck steering system, the truck braking system and the movement control system for the fork 2. The control system 4 serves, in the automatic mode of operation of the forklift truck 100, to control the movement of the vehicle as a function of its position in the room and of a predefined transport task. In addition, the movement of the fork 2 and/or of the vehicle is controlled as a function of the position of the pallet, the orientation of the pallet and the transport task. A manual operating lever 25 is provided to control the inclination, horizontal movement and vertical movement of the fork in the manual mode.

An ultrasound sensor 5 is located on the fork side of the industrial truck 100 and is connected to the control system 4. The ultrasound sensor 5 is active at least while the pallet is raised. The presence of obstacles or persons along the travel route is detected by the ultrasound sensor 5.

To prevent collisions with persons who are in the area of movement of the automatically operated forklift truck, infrared sensors 6a, 6b, 6c and 6d are located adjacent each corner of the industrial truck and are connected to the control system 4, as shown in FIG. 2 of the drawings. Two of the infrared sensors 6a, 6b are disposed near the front of the industrial truck 100 and two other infrared sensors 6c, 6d are disposed near the rear of the truck 100. The individual sensors of each pair of sensors are spaced-apart at a distance from each other. With these infrared sensors 6a–d, a large area can be monitored in both directions of travel. As soon as a person is detected by one of the infrared sensors 6a–6d, a signal is sent to the control system 4 and measures are taken to bring the forklift truck to a halt. For this, preferably two detection zones of the infrared sensors are programmable. When a person is detected in the first, more distant detection zone, the control system 4 causes a speed reduction of the vehicle. When a person is detected in the second, closer detection zone, the control system 4 triggers an emergency stop of the vehicle and an acoustic warning signal.

In addition, a bumper 7 is actively connected with at least the braking system of the truck 100 and is installed on the end of the forklift truck 100 opposite the fork 2. Thus, even should the infrared sensors 6a–6d fail, it is still possible to stop the vehicle, since the end of the truck 100 opposite the fork is the main drive direction when the forklift truck 100 is traveling in automatic operation. The truck 100 includes two drive wheels D and one steering wheel S. Emergency stop buttons may be placed on the sides of the truck to activate the emergency braking system.

Figure 3:
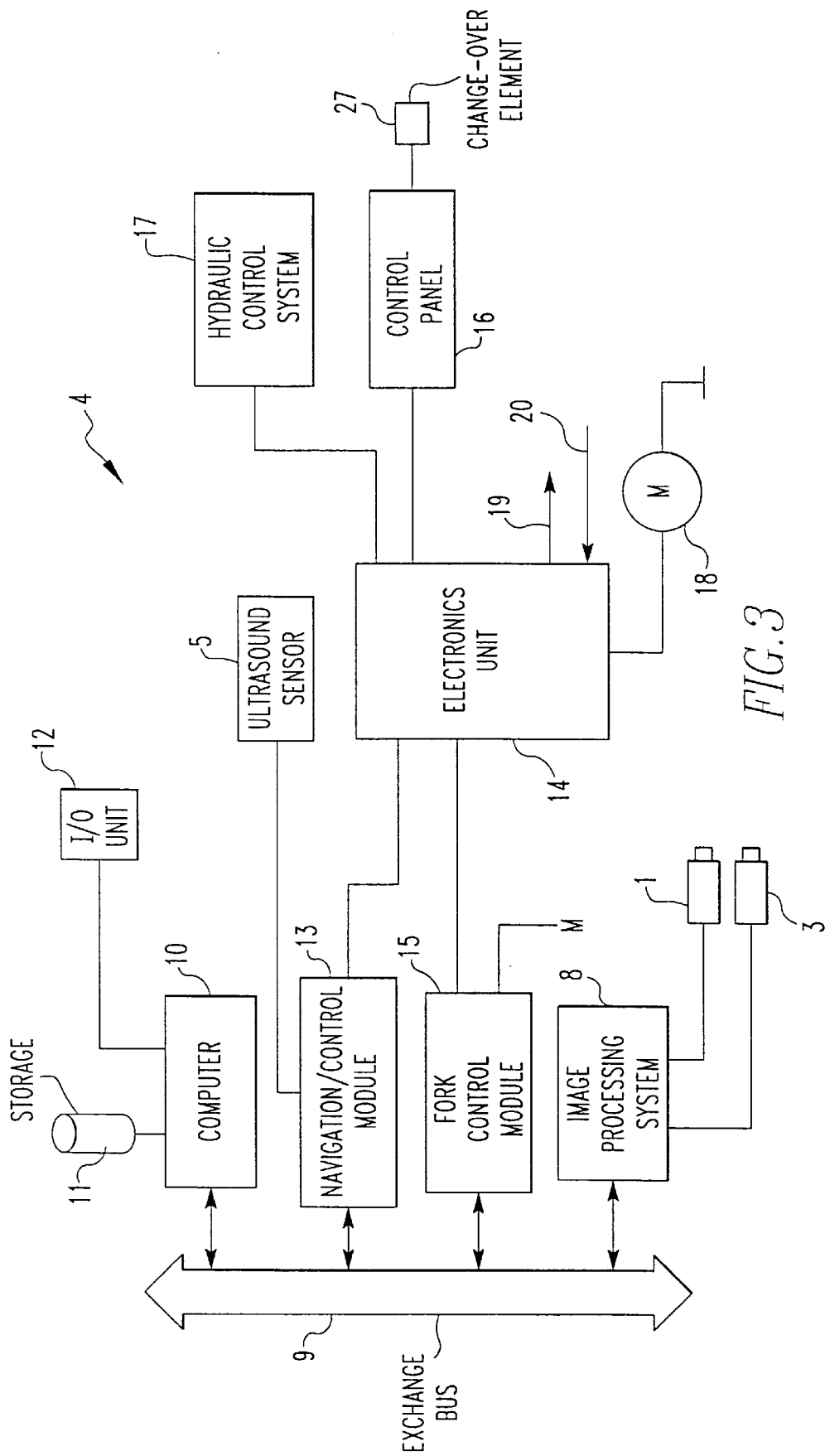
FIG. 3 is a schematic representation of an automatic control system of the invention.

A schematic of the control system 4 is shown in FIG. 3 of the drawings. The movable cameras 1 and 3 are connected to an image processing system 8. The image processing system 8 communicates via a suitable data exchange bus 9 with other, preferably modularly configured, subsystems of the control system 4.

The basis of the control system 4 is a computer 10 connected to the data exchange bus 9. The computer 10 is preferably designed as an industrial PC and is connected with storage (memory) 11 as well as an I/O (input/output) unit 12. The data on the surroundings of the forklift truck 100 and possible routes of travel are located in the storage 11. A transport task is defined using the I/O unit 12.

A combined navigation/control module 13 processes the signals of all navigation sensors, i.e., of the odometric sensors 23 disposed on the drive wheels D and on the steered wheel or wheels S of the forklift truck and of the cameras 1 and 3 as well as of the ultrasound sensor 5. The module 13 controls the vehicle drive, the vehicle steering and the vehicle braking systems. For this purpose, the module 13 is connected to an electronics unit 14, which determines the travel and work functions of the forklift truck.

A fork movement control system, having a fork control module 15, operates independently of the navigation/control module 13. The fork control module 15 is connected to the electronics unit 14. Microswitches M disposed on the fork 2 to ensure proper pickup of the pallet are also connected to the fork control module 15.

A control panel 16 of the forklift truck, a hydraulic control system 17 for the fork, and an electric motor 18 linked to the steering column of the forklift truck are connected to the electronics unit 14. In addition, a cable or connection 19 to an emergency brake relay and a cable or connection 20 for the vehicle-internal sensors are also connected to the electronics unit 14.

Using the on-board control system 4, the forklift truck 100 designed according to the invention is capable of freely navigating in a confined space, such as a room. As a function of the transport task predefined via the I/O unit 12 and the vehicle position in the room determined by means of the odometry system and the camera 3 connected to the image processing system 8, the control system 4 determines a suitable route among the routes recorded in the storage 11 and guides the forklift truck along this selected route by means of the navigation/control module 13.

Moreover, using the control system 4, the presence and the position of a pallet to be handled are detected by means of the camera 1 connected to the image processing system 8. The movement sequence of the fork 2 is controlled by means of the fork control module 15 for pickup of the pallet and, if necessary, the movement sequence of the forklift truck is also controlled by means of the navigation/control module 13.

Figure 4A:
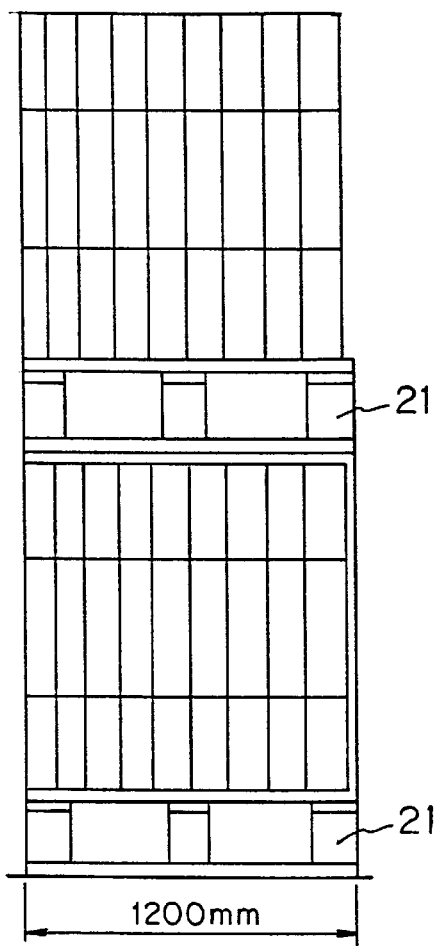
FIG. 4a is a side view of two stacked pallets with loads.
Figure 4B:
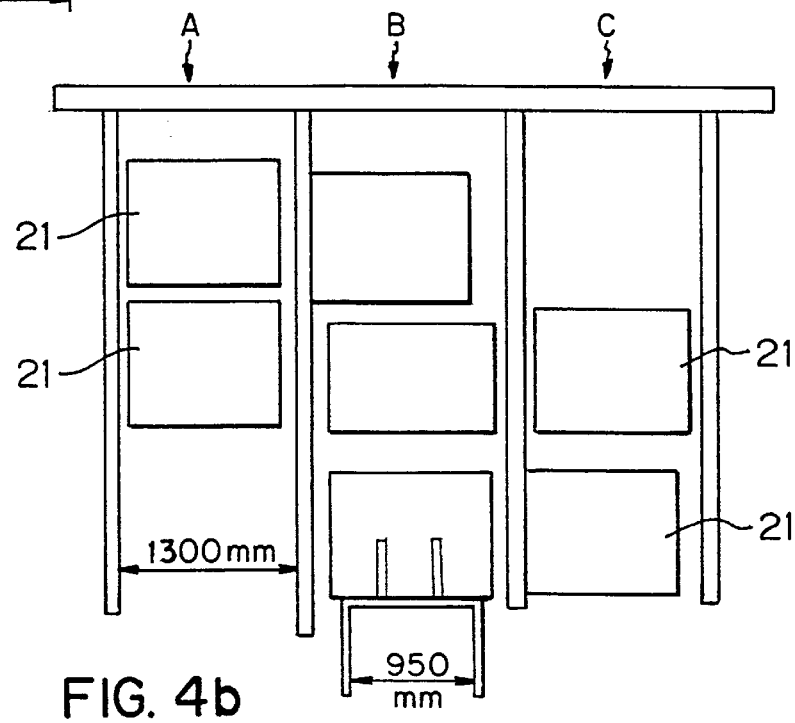
FIG. 4b is a plan view of a warehouse having stacked pallets.

With the truck 100 of the invention, it is not necessary that the pallet to be handled, or the load on it, be disposed in an exact predefined position in the room. Thus, FIG. 4b depicts a warehouse with three bays A, B and C, in which the bays A, B and C are each wider (for example, 1300 mm wide) than the width of the pallets 21 (for example, 1200 mm wide) stored therein. In the center B and the right C bay, pallets 21 with loads on them are arranged arbitrarily, i.e., non-uniformly with regard to the transverse dimensions of the passageways. Prior art driverless transport systems are not capable of picking up these loads. The forklift truck 100 according to the invention which, in this exemplary embodiment has a width of about 950 mm, enables automatic operation whereby, for example, the pallets 21 located in the center B and the right C bay are uniformly stacked in the left A bay (see also FIG. 4a).

The forklift truck 100 according to the invention is thus capable not only of being operated manually by a driver, but of autonomously undertaking transport and warehousing tasks, whereby no control via an external master monitor or central unit is necessary.

In one embodiment, the valves of the fork assembly are proportional electric valves rather than conventional mechanically operated valves shifted by a mechanical hand lever. These electric valves are connected to a joystick for manual control of the fork movements. In the manual mode, the joystick generates control signals for operation of the electric valves. In the automatic mode, the movement of the fork is controlled by the fork control module of the automatic control system which generates electrical signals for operating the valves.

To allow automatic steering control in the automatic mode, an electric motor is installed and is directly connected to the steering column. The electric motor is controlled by the automatic control system to steer the truck during automatic operation.

A change-over element 27 for switching between the manual and automatic modes may be configured as a switch operated by the driver which turns off the automatic functions. It is also possible to use several switches, each assigned to one automatic function, thereby allowing the automatic functions to be engaged or disengaged one at a time.

With respect to the navigation system for the industrial truck used in the navigation/control module, an example of one such navigation system is disclosed in European Patent Application 95202636.8 and is generally shown in FIGS. 5–11 of the drawings. The navigation system comprises coded signs at predetermined points and means for storing data regarding the environment, including data regarding the positions of the coded signs within the environment, means for the image acquisition and automatic recognition of the coded signs, a computer for estimating its own position and orientation relative to one of the coded signs and to the environment, means for acquiring the location of target positions, means for planning a path to be covered within the environment to reach target positions, and means for controlling the truck (robot) movement starting with the path data. The acquisition means are based on a passive visual system with standard CCD cameras without requiring any particular illumination.

The coded signs are generally called landmarks and are geometric entities, drawn on paper or cardboard fixed to the wall or ground, and may have different geometrical shapes according to operative constraints. Preferably, a landmark is composed of two concentric circles, of which the respective diameters are a fundamental characteristic. To increase the contrast and visibility to the passive visual system, the central region is white whereas the circular ring between the two circles is a dark color, in particular black. The advantages of using such landmarks are various and considerable. Firstly, there is a closed mathematical procedure enabling the spatial position and orientation of a circle to be calculated (knowing its radius) starting with the equation of the ellipse represented by its projection onto the image plane. A double circle, or a high-contrast circular ring, generates a very characteristic image which is difficult to confuse with pictorial structures within the environment. Finally, compared with other point configurations usable as landmarks, a circle causes no correspondence problems in that all the points in its image ellipse can be used indifferently to estimate its equation.

To make it possible to distinguish between several different signs having the same geometric shape configurations, the ratio of the two diameters is varied while maintaining the diameter of the outer circle constant. In this way, a distinctive feature of each sign is given by its ratio.

These landmarks are easily distinguishable from each other based on the different diameter of the inner circle, but in particular they are easily distinguishable from any object which may be located within the environment. This is essential to set the truck (robot) in a condition whereby any confusion and error is avoided. A robot should not confuse a different object for a landmark. Such landmarks are easy to construct, and because of their shape, there are no vertical or horizontal axes along which they have to be oriented.

The navigation system is fed with information concerning the configuration of the environment or environments within which the truck is supposed to operate.

This is done by inserting a map known as a global map containing the following data:
  graph of reference systems
  graph of navigation points
  list of landmarks These data are processed offline during the installation phase preceding the effective use of the truck.

Figure 5:
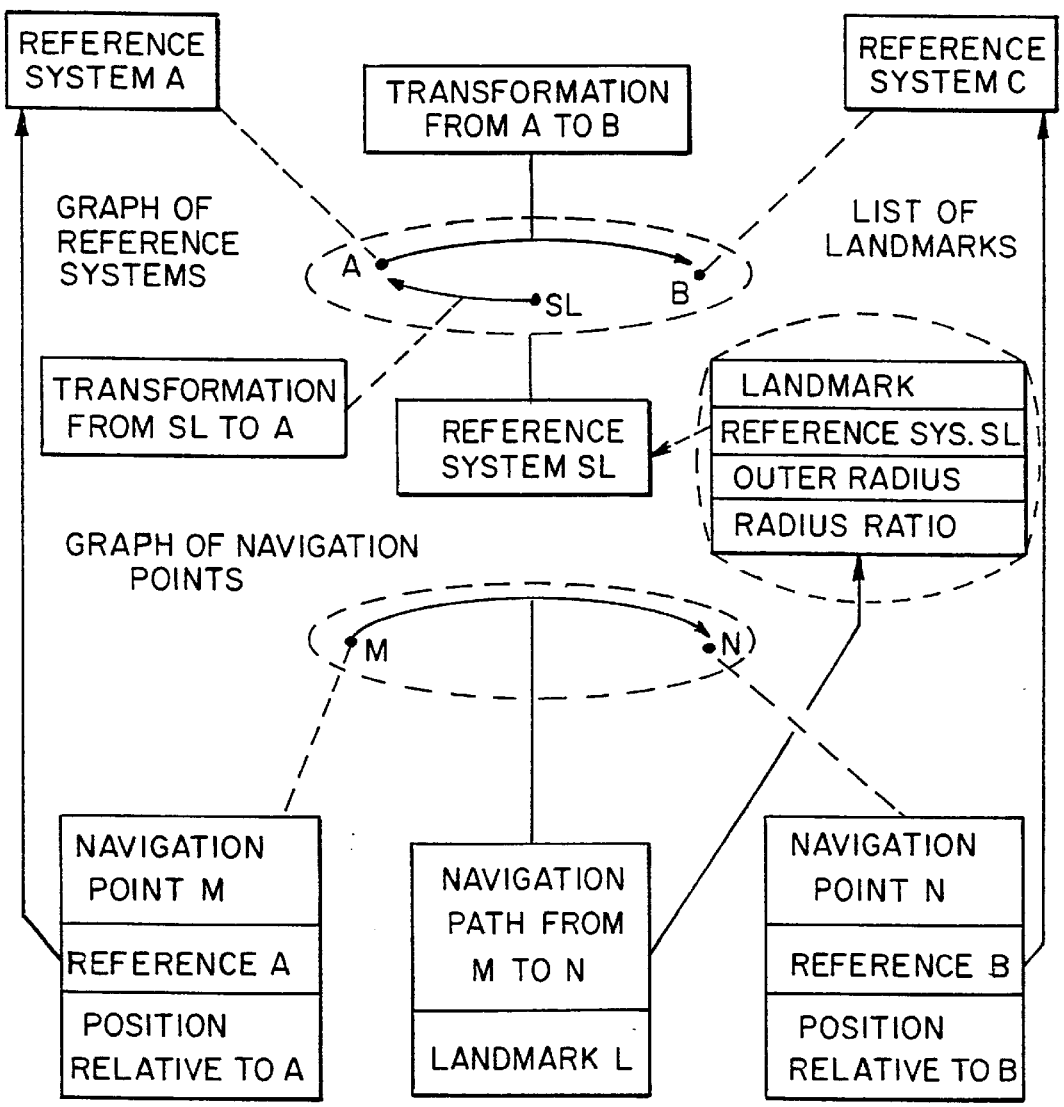
FIG. 5 is a schematic representation of a global navigational map suitable for the present invention.

The reference system graph describes the clockwise Cartesian reference system on the navigation plan (floor) and the coordinate transformations between them. Each reference system is represented by a vertex on the graph whereas the transformation of coordinates from one system to another is represented by an arch oriented from the vertex associated with the first system to that associated with the second and having as attributes the origin and orientation of the first reference system expressed within the second reference system. FIG. 5 describes the contents of a global map, in particular the graphs of the reference systems and navigation points.

Figure 6:
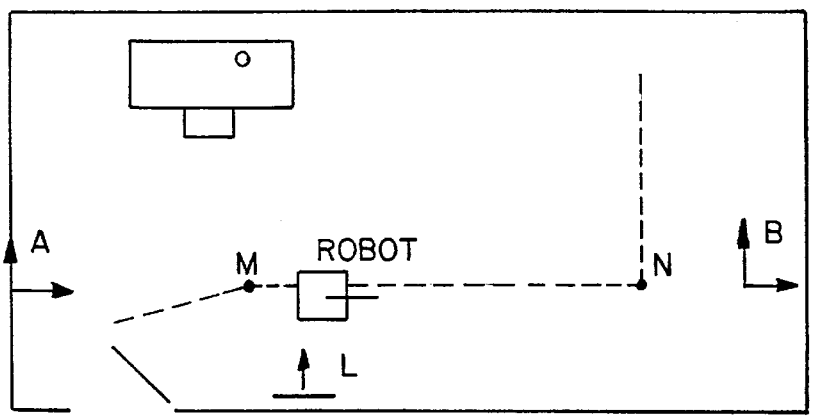
FIG. 6 represents a physical map of an environment within which a truck (robot) moving in accordance with the navigation system of FIG. 5 can be used.

The list of landmarks contains all the landmarks usable for navigation. For each of them, the associated reference system, the measurement of the circle diameter (i.e., of the outer concentric figure) and the ratio of the characteristic corresponding measurements of the two concentric geometric figures are reported. As already stated, this ratio must be such as to unambiguously identify the landmark. By convention, the reference system associated with the landmark finds its origin in the projection of the landmark center onto the navigation plane and its y axis corresponding to the straight line normal to the landmark plane, the positive direction being that emerging from the visible side. The navigation point graph contains those points in the navigation plane to which the truck can go and the straight lines between them along which it can travel. Each navigation point is represented on the graph by a vertex having as attributes the associated reference system and the point position expressed in the associated reference system. FIG. 6 shows a physical map to be associated with a global map, such as that of FIG. 5.

In the movement of the truck within an environment, the so-called mission is of considerable importance. A mission is a sequence of goals which the truck has to reach. Each goal is achieved by executing a list of motor actions, known as a task. The truck 100, by means of its control system 4, translates into effective action the sequential linking of such tasks, which constitute the given mission.

The implementation of a path or mission, starting from its starting point, comprises essentially the following steps:

1—the truck is made to move along the navigation point graph to the next navigation point;

2—by odometric measurements, the truck evaluates its position and stops when the predetermined navigation point is presumed to have been reached;

3—at this point the truck attempts to frame a landmark positioned in proximity to the reached navigation point;

4—having framed the landmark and recognized it from the landmark list available to the truck, it estimates its position and orientation relative to it and on the basis of this information updates its position and orientation within the known global map;

5—the truck repeats steps 1 to 4 for the next navigation point, until it has completed its mission.

The essential point is the method of framing and recognizing the landmark and of estimating the position and orientation of the truck relative to the landmark. Of fundamental importance is, therefore, the ability of the navigation camera 3 to build up an image and to obtain geometric information therefrom.

For a given framed scene, the vision system (composed of the camera 3 and an acquisition card) provides as output a bidimensional spatial representation known as the image matrix, or merely the image, in the form of a rectangular matrix of positive values. It is formed by using a sensor inside the camera 3 divided into a rectangular grid of photosensitive cells, for each of which the incident light intensity is measured. With each of these cells there corresponds a different element of the image matrix, known as a pixel, the value of which, known as the grey level, is proportional to the light intensity incident on the corresponding cell. The CCD sensor is a rectangular matrix of photosensitive cells mapped onto a corresponding pixel "image" matrix obtained by analog/digital sampling of the camera output analog signal. To describe the geometric model which relates a generic point within the scene to its corresponding pixel within the image, it is firstly necessary to define as the image plane that plane within space which contains the telecamera sensor. As can be seen from FIG. 8, the image of a generic scene point P on the sensor is the point IP intersected on the image plane SEN by the straight line joining the point P to a fixed point OC known as the optical center or pinhole. The optical center is approximately at the center of the camera lens system. As the position of the optical center OC relative to the image plane SEN does not depend either on the orientation of the camera or its position, the image center OI can be defined as the perpendicular projection of the optical center OC on the image plane SEN. The distance between the optical center OC and the image center OI is known as the focal length and the straight line joining the two points is known as the optical axis. An image formation model of this type is known as a pinhole camera model. The coordinates xI(IP) and yI(IP) of the image point IP expressed as units of focal length within the reference system centered on the image center OI are obtained from the coordinates xC(P) and yC(P) of the point P within the reference system centered on OC as:

$$xI(IP) = \frac{xC(P)}{zC(P)}$$

$$yI(IP) = \frac{yC(P)}{zC(P)}$$

Figure 9:
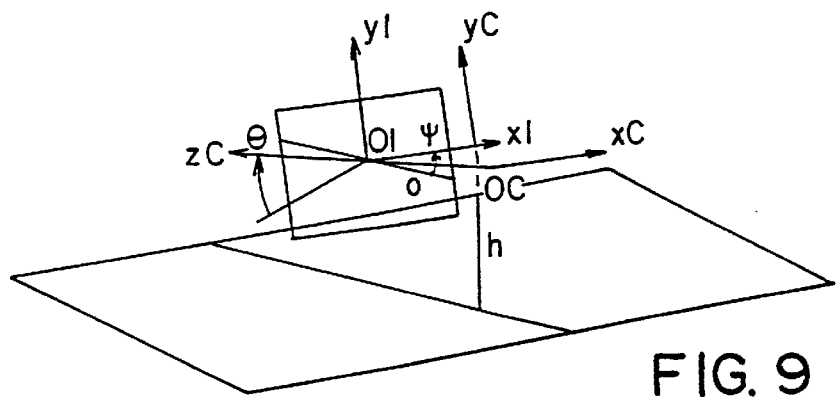
FIG. 9 shows the relationship between the camera calibration plane and the camera orientation.

As can be seen from FIG. 9, the orientation of the camera 3 relative to the horizontal navigation plane is defined by two angles: the tilt angle θ indicates the inclination of the optical axis zC to the navigation plane; and the swing angle Ψ indicates the rotation between any straight line parallel to the horizontal line and the horizontal axis xC of the camera. The position of the camera relative to the navigation plane is specified by the height h in millimeters of the optical center OC above the navigation plane.

Figure 10:
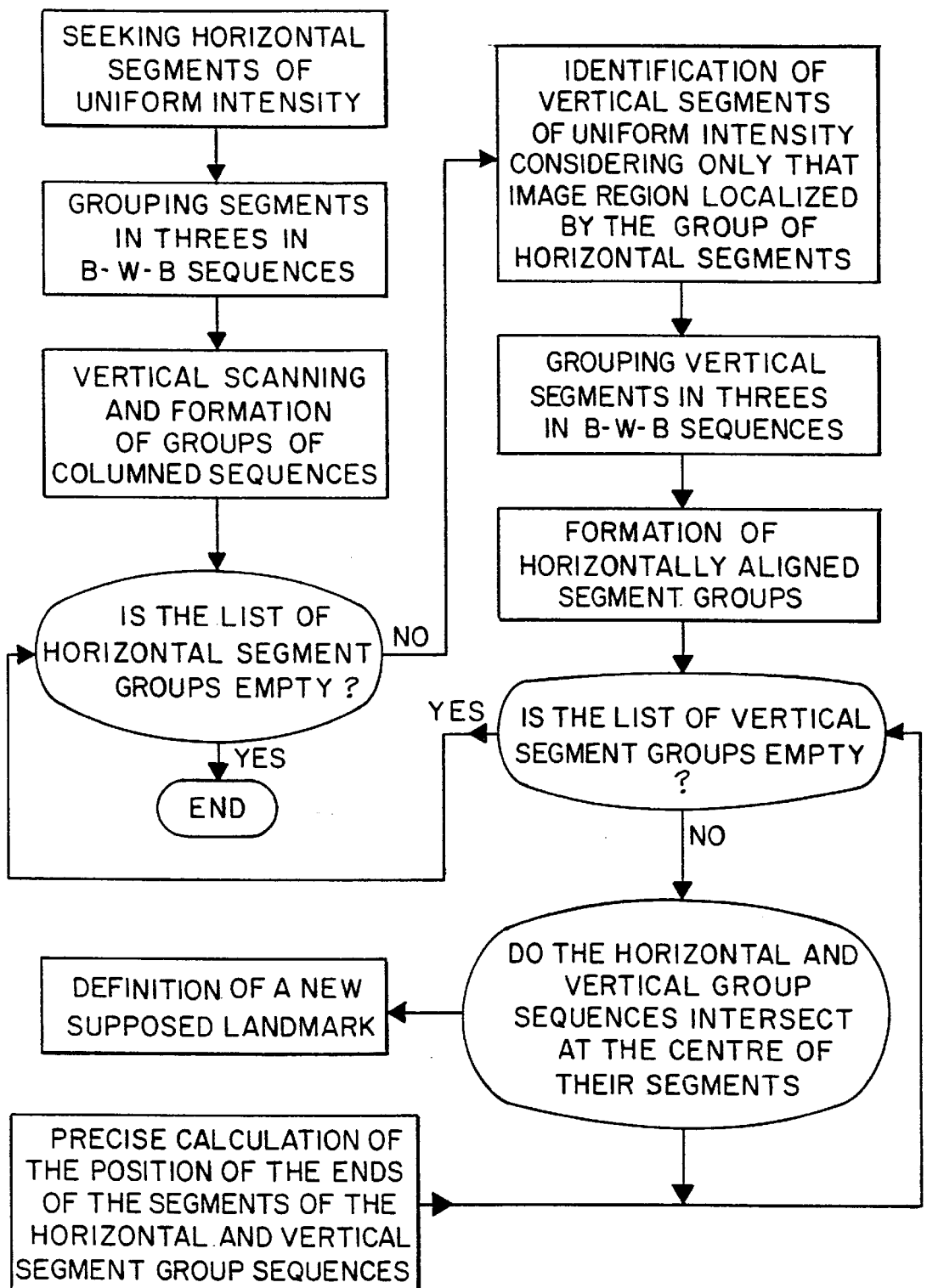
FIG. 10 is a flow diagram schematically showing a procedure according to the present invention for recognizing a landmark in an image.

The flow diagram of FIG. 10 illustrates the detecting procedure of the presence of a landmark within the visual field of the camera 3. The image is divided into a predefined set of equidistant rows, each of which is scanned horizontally in a search for points in which the light intensity undergoes a value change exceeding a given threshold. These points are then considered as the ends of segments along which the light intensity is virtually constant. Each segment in which the intensity increases in moving from the interior of the segment to the outside is considered as black (B) whereas the reverse case is considered as white (W). Each line hence generates sequences of black segments and white segments. The same image is then scanned by vertical columns in the same manner. Again in this case sequences of black segments and white segments are obtained.

By suitably analyzing and reprocessing the segment sequences, the form of the possibly framed landmark can be constructed and compared with each of the possible forms known to the processor. By a first approximated procedure of intersection of the sequences obtained by scanning the image vertically and horizontally, a rough estimate of the significant dimensions of the possible framed landmark is obtained. A more refined procedure, in which starting with the rough estimate the light intensity gradient in the transition regions from white segment to black segment or vice versa is analyzed, enables the sizes of the two ellipses represented by the image of the landmark circles to be computed with precision.

With a more refined procedure, in which starting with the rough estimate the light intensity gradient in the transition regions from white segment to black segment or vice versa is analyzed, it is possible to identify with precision a plurality of points belonging to the images of both the circular contours of the landmark. These contour images are a pair of concentric ellipses, whose equations are obtained by fitting the general ellipse equation with the points. Starting from the equation of the outer ellipse and using a mathematical procedure known as perspective inversion, the position and orientation of the landmark relative to the camera 3 is evaluated. Such evaluation is done by calculating in which position the landmark should be, in order for its outer circular contour to produce the acquired image. This corresponds to a hypothetical superimposition of the deformed landmark contour and the acquired image. From a knowledge of how the camera 3 is positioned and oriented relative to the truck, it is hence possible to evaluate the position and orientation of the truck relative to the landmark. The same perspective inversion procedure is then repeated on the inner ellipse by calculating the distance from the optical center of the camera at which the center of a circular contour of diameter equal to the outer circular contour of the landmark would have to necessarily lie in order to produce said inner ellipse.

The ratio of the diameter of the outer circle to the diameter of the inner circle of the landmark is then calculated as the ratio of the distance calculated above to the distance of the landmark center from the optical center as deduced from the previously evaluated position and orientation. This diameter ratio, indicated in the landmark list as a previously known ratio of two corresponding measurements characteristic of the two concentric circular contours of the framed landmark, enables the landmark to be unambiguously identified.

A fundamental requirement of the system is to have a calibrated camera 3. In this respect, to be able to obtain geometric information on the position and orientation of the truck from images acquired by a vision system on board, it is necessary to have initially identified the relationship linking the position relative to the vehicle of a generic point within the scene and its image point. To achieve this, use is made of a sequence of images of a reference object of known characteristics taken from different viewing positions. In particular, a known regular rectangular planar lattice formed from a plurality of rows and columns of regular geometric shapes is framed.

Figure 7:
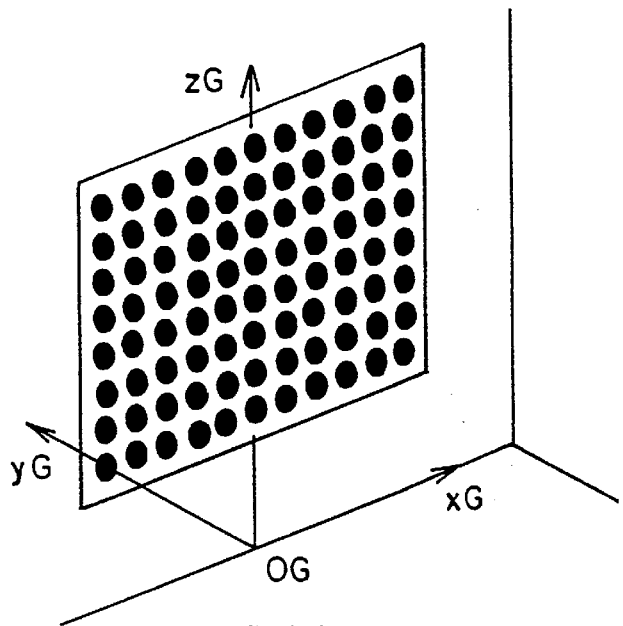
FIG. 7 represents an image used for calibrating a camera.
Figure 8:
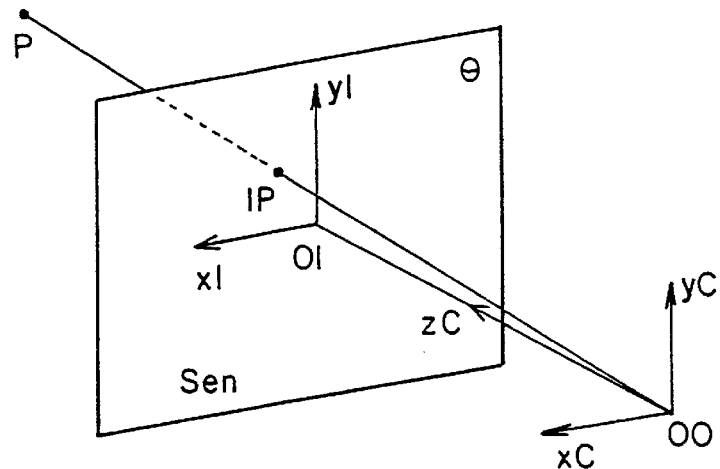
FIG. 8 shows the relationship between the image plane of the camera and its optical center.

With reference to FIG. 7, for this purpose a regular rectangular lattice formed from rows and columns of dark identical dots on a light background is used. It is arranged in a plane perpendicular to the navigation plane, to define a rigidly connected clockwise reference system G having as its axis zG the upwardly directed vertical axis passing through the centers of the dots of the central column and further having as its origin OG the intersection of zG with the navigation plane and as its axis yG the axis parallel to the navigation plane and perpendicular to the lattice plane directed as the exit vector from the viewing point OC and entering the lattice plane perpendicularly. The axis xG is horizontal and lies in the lattice plane directed towards the right when viewing the lattice from the front, as shown in FIG. 7.

The purpose of the calibration procedure is to find the effective geometric relationship between points within the scene and their image points acquired by the vision system and the transformation between this latter and the odometric measurement system. Using the pinhole camera model, an image formation model must first be devised which depends only on a limited number of free parameters for which those values must then be found such that the model deriving from them reproduces as accurately as possible the transformation from three-dimensional points of known position of the current odometric reference system to the corresponding points in the image. The free parameters of the image formation model are those referred to in the pinhole camera model: the focal length $\alpha_u$ and $\alpha_v$ expressed in width and height of a pixel; the coordinates $(u_0, v_0)$ of the image center expressed in pixels, the position of the camera relative to the navigation plane; the height h of the optical center above the navigation plane; the tilt angle $\theta$ and the swing angle $\Psi$. Other parameters link the camera reference system projected onto the navigation plane to the odometric reference system rigidly connected to the vehicle. Finally, there are those parameters which link the initial odometric reference system with the reference system rigidly connected to the calibration lattice; excluding these latter parameters relative to the lattice, the values of all the other parameters constitute the result of the calibration procedure and are used as input data, coming from the landmark location procedures.

From the image formation model, two mathematical functions are defined giving the position in pixels of the center of a given dot within the image taken by the truck in a certain position and orientation O with respect to the initial odometric reference system, the dot having known coordinates expressed in the lattice reference system, as a function of the model free parameter vector.

The calibration procedure is divided into three steps: initial image acquisition from various positions, measurement of the centers of the dots visible in the given images, followed by their processing to find the free parameters of the image formation model.

In the first step, i.e., image acquisition, use is made of a predefined list of a given number of positions and orientations which the truck must sequentially reach in order to acquire afterwards in each case an image of its calibration lattice, which is stored in the image list for the second part of the calibration procedure. Associated with each acquired image, the position and orientation of the truck, estimated by the odometric system within a reference system which does not vary during the procedure, is stored. In the second step, the user considers all the images of the image list prepared during the first step. In each of these, he selects four not aligned in triplets reference dots. The transformation from points of the lattice to corresponding points of the image is a transformation between two projecting planes, so that it is possible to interpolate the positions of the centers of the four selected dots to also estimate the centers of the other lattice dots on the image. The image is binarized, i.e., the grey level of each pixel is set to the maximum or minimum value possible according to whether it is greater or less than a certain threshold set by the user. For each lattice dot a procedure is then performed for measuring the position of its center within the image. Use is made here of the fact that the pixels of a dot image are all at the same value by the effect of the binarization, as the lattice dots are dark on a clear background. The maximum connected region having the maximum grey level formed from pixels and containing that pixel which the preceding interpolation indicated as the dot center is then identified. The new measurement of the center position is then calculated as the position of the barycenter of the pixels of this region.

In the third calibration step, the predicted position of the centers of the framed dots in the various images is calculated on the basis of the free parameters of the image formation model to hence construct an error function which is the sum of squares of the distances of the positions of the dot center on the image measured from their positions as predicted by the image formation model when the vehicle is in the corresponding position and orientation specified in the position list for image taking. The free parameter values which minimize this error function are those which best fit real images.

It should be noted that the truck 100, in order to correctly identify its position, needs to frame only one landmark. This means that the navigation system is less invasive of the environment, is of lower cost and requires less maintenance. During the framing procedure it may happen that the truck has accumulated such a quantity of position errors that it is unable to find any landmark within the expected field of vision. In this provision, the camera 3 is rotated in a horizontal plane. This facility increases the reliability of the entire truck 100, and allows it to be accurately oriented under all conditions within the environment in which it moves. For improved handling and control, the truck further comprises an interactive terminal, such as an alphanumerical display and a keyboard (i.e., the I/O unit 12).

With respect to determining the openings in the pallet for insertion of the prongs of the fork 2, an example of one such system is disclosed in Italian Patent Application MI94A002321 and is generally shown in FIGS. 12–17 of the drawings. The system sets forth an effective and advantageous procedure for estimating the position and orientation of the camera-framed pallet relative to the camera 1 itself. The procedure, following acquisition and memorization of the geometrical information defining the pallet model by the computer, comprises the following steps:

(a) acquisition of the estimated position and orientation of the pallet either by other sensors or by prior knowledge, so as to identify a region in which with high probability the pallet to be framed, defined by two cavities, is positioned;

(b) on the basis of the prior estimate, framing by the camera 1 of that region in which one of the sides of the pallet is assumed to be present;

(c) transforming the image obtained by the camera 1 into a digitized image in pixels, each pixel being assigned a grey value between the extreme values white and black;

(d) determining within the image, and separately one from the other, two separate connected "dark" grey regions corresponding to the cavities which define the pallet;

(e) estimating the position of the two centers of the two "dark" grey regions corresponding to the centers of the cavities of the previously known pallet model;

(f) performing a perspective inversion on the model with respect to the optical center of the camera 1 and computing with the data of the perspective inversion the position and orientation of the pallet relative to the camera 1.

Starting with this information, i.e., the position and orientation of the pallet relative to the camera 1, it is possible to obtain the position of the two cavities into which the two prongs of the fork 2 have to be inserted. Using this data, the computer 10 can direct the fork prongs to move towards the two cavities to engage the pallet.

Starting with the image transformed into a pixel image, the two separate connected grey regions are determined by the following steps, which are implemented twice independently, once to seek the left cavity and once to seek the right cavity;

(g) estimating the positions of the center of the pallet cavities starting with the previous estimate of the pallet position and orientation;

(h) seeking the point of darkest grey, known as the kernel point, within a rectangle of determined dimensions centered on the two centers;

(i) by means of an iterative growing procedure about the kernel points, constructing a connected region in which the pixels have a grey level less than a predetermined value;

(j) iterating the growing procedure, each time increasing the threshold grey value by a given fixed quantity and verifying at each growing iteration that the degree of rectangularity of the determined region has not decreased, where the degree of rectangularity is expressed as the ratio of the area of the connected grey region to the area of the rectangle which contains it (circumscribed);

(k) at each iteration, further verifying that the dimensions of the region do not exceed the maximum dimensions determined on the basis of the previous estimate of the pallet position and orientation and the camera calibration;

(l) if at least one of the verifications (j) and (k) fails, then annulling the last iteration, restoring the preceding region and updating, by reduction, the increase in the threshold grey level for subsequent iterations of the growing procedure; repeating the procedure starting with point (i), considering as kernel points all those at the edge of the restored region;

(m) halting the growing routine at the moment in which the increase in the threshold grey level cannot be further decreased without becoming equal to zero.

The system requires as input a rough estimate of the position and orientation in which the pallet to be moved may be lying. This information is known as the "fictitious pallet position". Starting with this information, the system moves the camera 1, (for example a black/white CCD type) mounted rigidly with the fork prongs, in such a manner as to be able to frame the region of maximum probability of encountering a pallet, and via the acquisition apparatus obtains a digitized image in pixels. In conventional manner, there is associated with each pixel a value representing a grey level using a number for example between 255 and 0, where the value 255 corresponds to white (maximum grey level) and the value 0 corresponds to black (minimum grey level).

At this point the system seeks within this digitized image two mutually separate regions, each of them connected and characterized by a sufficiently dark grey level. The two pallet cavities, namely right and left, i.e., the two regions into which the forklift prongs are to be inserted, should correspond to these dark regions. Generally, when observed frontally, the cavities are in shadow relative to their edges, because the overlying load does not allow light to illuminate the cavities.

Figure 13:
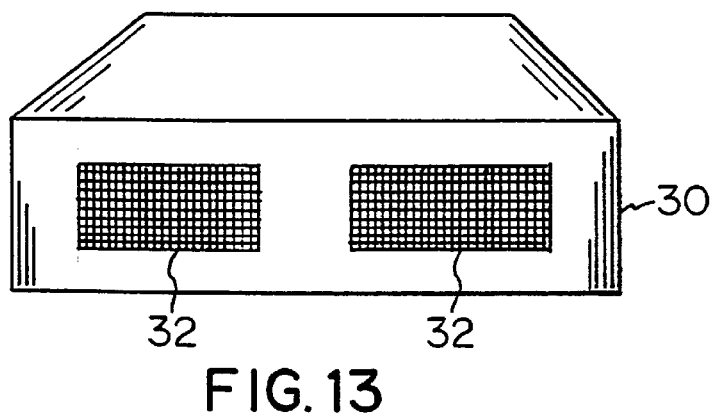
FIG. 13 is a pallet geometrical model.
Figure 14:
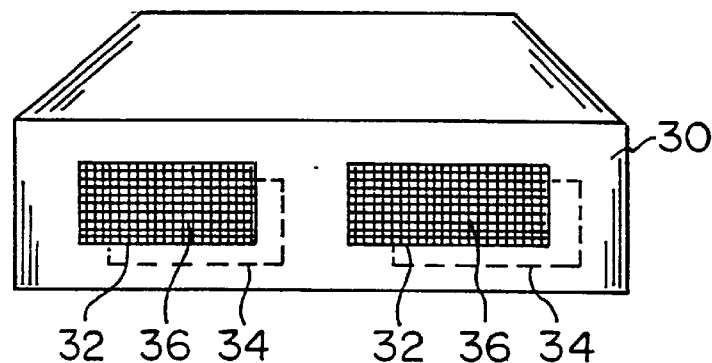
FIG. 14 is a step in the procedure for identifying and estimating the pallet position and orientation.

For this purpose, the pallet model shown in FIG. 13 is used, in which the reference numeral 30 indicates the wooden structure of a pallet and 32 indicates the two darkly appearing cavities into which the forklift prongs are inserted. FIG. 14 illustrates the framing by the camera 1, showing the pallet as it appears. In FIG. 14, the dashed lines represent the fictitious contours of the fictitious pallet cavities 34, obtained by projecting the theoretical pallet model memorized by the system in the fictitious position obtained as heretofore described. The centers of the two fictitious cavities 34 are indicated in FIG. 14 by the reference numeral 36. Having established the fictitious cavities 34, this procedure also fixes the presumed minimum and maximum dimensions of the cavities 32, measured along the horizontal axis and vertical axis of the image.

The image of FIG. 14 is digitized into pixels, assigning to each pixel a grey value corresponding to its light intensity. A window positioned on the center 36 of the fictitious cavities 34 is scanned to identify that pixel having the darkest grey level. This pixel is known as the kernel.

Having obtained by this search procedure a kernel presumably pertaining to a cavity 32, an iterative routine is used to construct a connected dark region around the kernel, starting with its grey level as the initial threshold. At each step, the current region is increased by all the points 4-connected to the edge pixels of the region which have a grey value less than the grey threshold (i.e., a darker grey than the grey level defined by the threshold) and bounding at least one point added to the previous step. The term "pixels 4-connected to a generic point" means the points adjacent to the point to the north, south, east and west. The routine is iterated for increasing threshold values. Each step ends when no pixel connected to the boundary pixels of the current region has a grey value less than the threshold value.

At this point an error signal may occur ("absence of cavity") should the routine have ended without encountering a connected region of dimensions at least equal to the minimum dimensions and less than the maximum dimensions already given. The minimum dimensions are a percentage of the dimensions of the already calculated fictitious cavity. In this respect, an insufficiently large grey region could accidentally exist within the region framed by the camera 1, and hence not be the image of a cavity 32. To prevent confusion by the system, the connected dark region which it seeks must extend at least as far as the edge of the region defined by the minimum dimensions.

If however, the system recognized a connected dark region of sufficiently large dimensions (FIG. 16), the iterative growing procedure continues to add a larger pixel region, the grey value of which is less than a new threshold grey value slightly greater than that of the previous step.

At each iteration step, from this moment on, the system carries out a check on the so-called degree of rectangularity of the recognized dark region. This degree of rectangularity is expressed as the ratio of the area of the connected grey region obtained at the last iteration step to the area of the rectangle which circumscribes it. The closer this ratio is to one, the more the grey region has an almost rectangular shape. As the pallet cavities are rectangular in shape, the system seeks to recognize dark regions as close as possible to rectangular in shape.

For this purpose, the highest degree of rectangularity obtained in the preceding iterations is considered. If at a certain step in the iteration the degree of rectangularity of the recognized region is less than said previously obtained degree, the system updates the grey threshold by increasing its value by a given quantity (enabling pixels of a lighter grey to be added). At this point the system proceeds by repeating the last iteration of the growing procedure using the new grey threshold.

This iterative growing procedure terminates before the current region exceeds the dimensions (height, length, area) of the region defined by the maximum supposable cavity dimensions, already obtained as described during the last iteration. If the current region exceeds these limits, the system decreases the grey threshold value so as to compress the connected region, so that it lies within the aforesaid dimensional limits.

Figure 16:
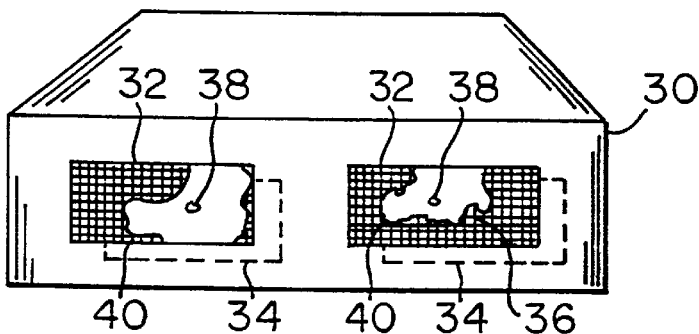
FIG. 16 shows the result of the first step of the growing routine shown in FIG. 15.
Figure 17:
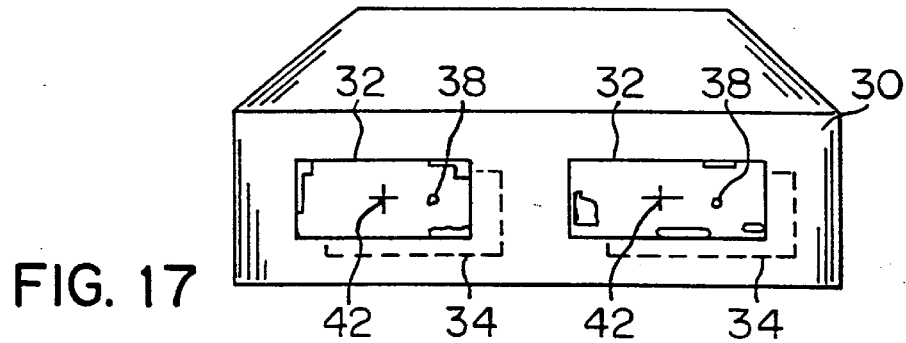
FIG. 17 shows the result of the second step of the growing routine shown in FIG. 15.
Figure 15:
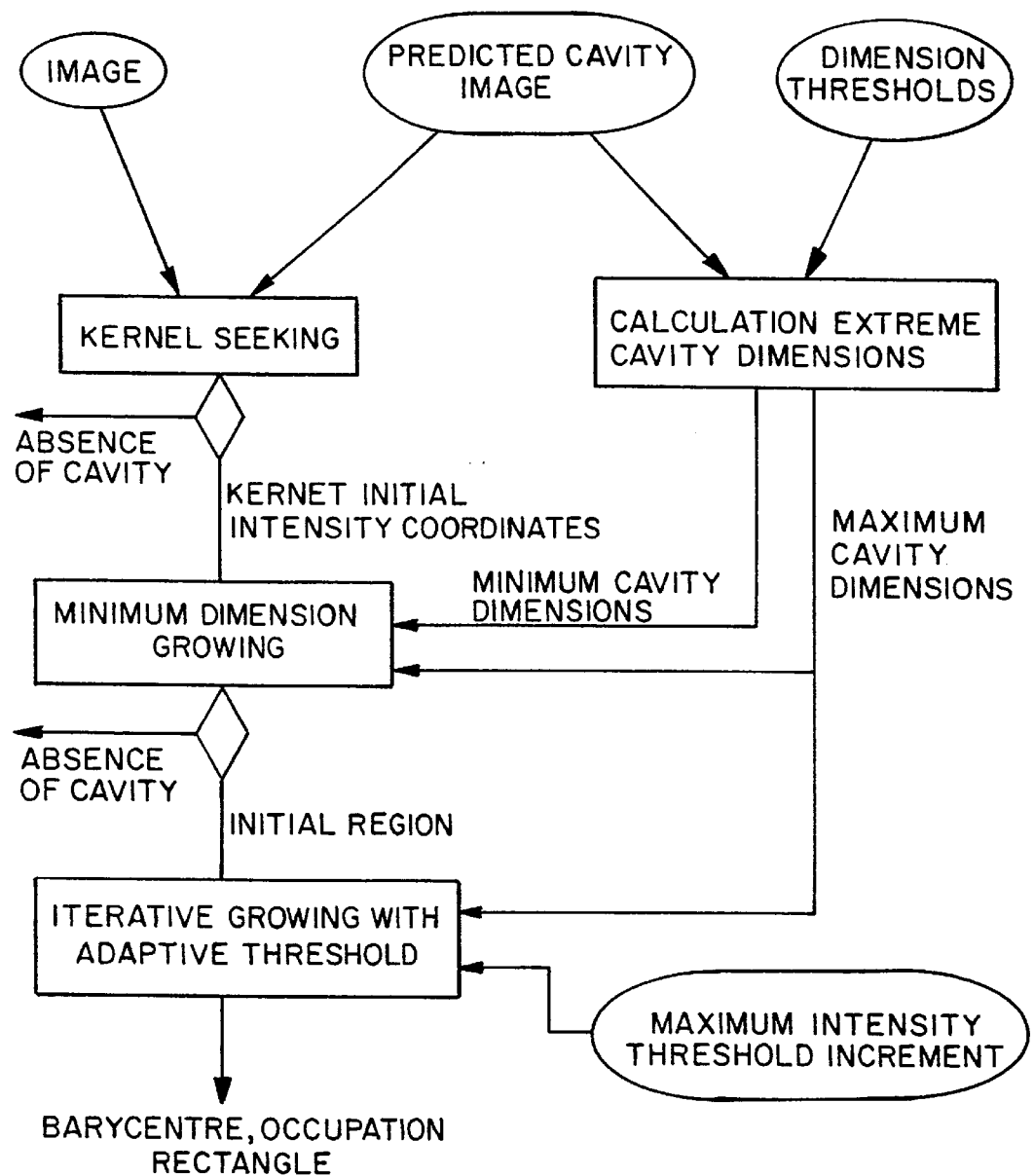
FIG. 15 shows the growing routine on the connected grey region for pallet cavity detection.

The situation reached at this point of the procedure is shown in FIG. 17, in which the reference number 30 indicates the pallet structure of wood or other material, 32 defines the two real cavities and 34 defines the two fictitious cavities. Within the fictitious cavities 34, the reference numeral 36 indicates the center of the cavities. The reference numeral 38 indicates the two kernels found independently of each other by the procedure described above within the region defined by the two fictitious cavities 34. By means of the aforedescribed growing procedure, a respective connected dark grey region, indicated by 40 in FIG. 16, is obtained about each of the two kernels.

Following the identification of the two connected grey regions, the system proceeds to identify the two centers of the two regions. The respective center of each of the two regions is defined as the barycentric point of the region.

In FIG. 17, these centers are indicated by the reference numeral 42 as white crosses on a black background.

Having constructed the positions of the two centers 42 and using the memorized pallet model, the system is able to use the information to calculate the position and orientation of the pallet relative to said camera 1. This calculation is made by perspective inversion of the pallet model located centered on the two centers 42 of its two cavities.

At this point the system, by following all the steps, has available all the information necessary for it to effectively and reliably guide the fork prongs so that they become inserted into the pallet cavities 32. The system can advantageously be made to interact with an operator, who can intervene by modifying the working parameters or by guiding the system if an error signal arises.

While preferred embodiments of the invention have been described in detail herein, it will be appreciated by those skilled in the art that various modifications and alternatives to the preferred embodiments may be developed in light of the overall teaching of the disclosure. Accordingly, the particular arrangements are illustrative only and are not limiting as to the scope of the invention which is to be given the full breadth of the appended claims and any and all equivalents thereof.

We claim:

1. An industrial truck selectively operable between a manual mode and an automatic mode, comprising:

a movable fork for handling pallets with loads located thereon;

an automatic control system for automatic operation of the truck, wherein the automatic control system is configured to selectively engage at least one of a truck drive system, a truck steering system, a truck braking system and a movement control system for the fork;

means for the input and storage of travel routes and a transport task;

means for the autonomous determination of a position of the truck in a room;

means for control of the movement of the truck as a function of the position of the truck in the room and of the transport task;

means for detection of the presence, the position, and the orientation of a pallet;

means for control of the movement of at least one of the fork and the truck as a function of the position of the truck, the orientation of the pallet and the transport task; and means for deceleration of the vehicle in the presence of obstacles.

2. The industrial truck as claimed in claim 1, wherein the automatic control system is configured for automatic management of the movements of pallets which are stacked on top of each other in a plurality of levels.

3. The industrial truck as claimed in claim 1, wherein the means for autonomous determination of the position of the vehicle in the room includes an odometry system and an image processing system with at least one navigation camera.

4. The industrial truck as claimed in claim 3, wherein the navigation camera is located in an upper region of the industrial truck on a side of the truck opposite the fork.

5. The industrial truck as claimed in claim 1, including at least one sensor connected to the automatic control system and configured to detect a pallet located on the fork.

6. The industrial truck as claimed in claim 1, wherein the means for detection of the presence, the position and the orientation of a pallet includes an image processing system with at least one camera attached to the side of the industrial truck adjacent the fork and configured to have a motion identical to that of the fork.

7. The industrial truck as claimed in claim 1, including odometric sensors configured to provide at least one of a position of inclination, a horizontal displacement and a vertical displacement of the fork to the automatic control system.

8. The industrial truck as claimed in claim 1, including a manual operating lever configured to control the inclination, horizontal movement and vertical movement of the fork in the manual mode.

9. The industrial truck as claimed in claim 1, including at least one infrared sensor connected to the automatic control system and configured to determine the presence of the obstacles along a path of travel of the truck.

10. The industrial truck as claimed in claim 1, including an actuator which is actuated at least one of directly and indirectly by the automatic control system to control the steering of the industrial truck in the automatic mode.

11. The industrial truck as claimed in claim 1, including means for feeding an alternative speed signal to the automatic control system.

12. The industrial truck as claimed in claim 1, including means for regulating the speed of the truck by the control system as a function of a curvature of the curves of a path of travel of the truck.

13. The industrial truck as claimed in claim 1, including means for automatically activating at least one of a negative brake and parking brake of the truck.

14. The industrial truck as claimed in claim 1, wherein the automatic control system includes an input/output unit to allow a user to input commands into the automatic control system.

15. An industrial truck selectively operable between a manual mode and an automatic mode, comprising:
   a movable fork mounted on the truck;
   a first camera mounted on the truck and configured to move with the fork;
   a second camera mounted on the truck;
   an automatic control system mounted on the truck, wherein the first and second cameras are in electronic communication with the automatic control system.

16. The industrial truck as claimed in claim 15, including an ultrasound sensor mounted on the truck adjacent the fork and in electronic communication with the automatic control system.

17. The industrial truck as claimed in claim 15, including at least one infrared sensor mounted on a front of the truck and at least one other infrared sensor mounted on a rear of the truck, wherein the infrared sensors are in electronic communication with the automatic control system.

18. The industrial truck as claimed in claim 15, including a bumper mounted on a rear of the truck opposite the fork and in electronic communication with the automatic control system.

19. The industrial truck as claimed in claim 15, wherein the truck has a brake system and a steering system and the automatic control system is configured to reversibly engage and control the brake system and the steering system of the truck.

20. The industrial truck as claimed in claim 15, wherein the automatic control system includes a navigation/control module in electronic communication with a data exchange bus and an electronics unit, wherein the electronics unit is in electronic communication with a brake system and a steering system of the truck.

21. The industrial truck as claimed in claim 15, wherein the truck has a drive system and a fork movement control system and the automatic control system is configured to reversibly engage and control the truck drive system and the fork movement control system.

22. An industrial truck selectively operable between a manual mode and an automatic mode, comprising:
   a movable fork mounted on the truck;
   an automatic control system mounted on the truck;
   a first camera mounted on the truck and configured to move with the fork, wherein the first camera is in electronic communication with the automatic control system;
   a navigation camera mounted on the truck and in electronic communication with the automatic control system;
   an ultrasound sensor mounted on the truck adjacent the fork and in electronic communication with the automatic control system;
   at least one infrared sensor mounted on a front of the truck and at least one other infrared sensor mounted on a rear of the truck, wherein the infrared sensors are in electronic communication with the automatic control system,
   wherein the automatic control system is configured to reversibly engage at least one of a truck drive system, a truck brake system, a fork movement control system and a truck steering system.

23. The industrial truck as claimed in claim 22, wherein the automatic control system includes:
   an image processing system in electronic communication with a data exchange bus and wherein the first and navigation cameras are in electronic communication with the image processing system;
   a computer in electronic communication with the data exchange bus;
   an I/O unit in electronic communication with the computer;
   a fork control module in electronic communication with the data exchange bus and an electronics unit, wherein the electronics unit is in electronic communication with a hydraulic control system for the fork;
   a navigation/control module in electronic communication with the data exchange bus and the electronics unit, wherein the electronics unit is in electronic communication with a brake system and a steering system of the truck; and
   an ultrasound sensor in electronic communication with the navigation/control module.

* * * * *

UNITED STATES PATENT AND TRADEMARK OFFICE
CERTIFICATE OF CORRECTION

PATENT NO.   : 5,938,710
DATED        : August 17, 1999
INVENTOR(S)  : Fabrizio Lanza et al.

It is certified that error appears in the above-identified patent and that said Letters Patent is hereby corrected as shown below:

Title Page, insert:
    --[30] Foreign Application Priority Data
      Apr. 3, 1996   [DE]   Germany ........ 196 13 386--.

Figure 11A:
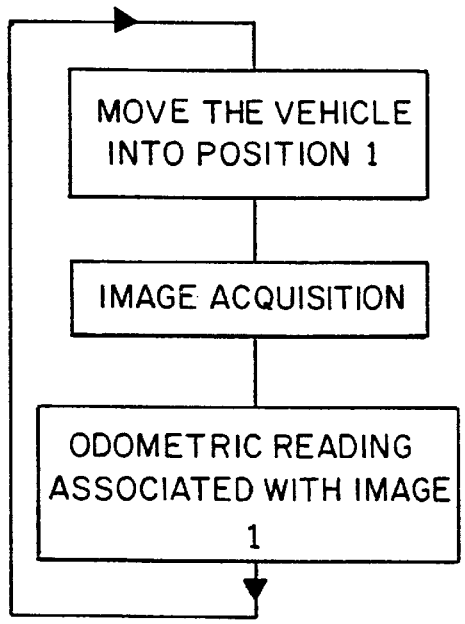
FIG. 11 is a flow diagram schematically showing the steps involved in calibrating a camera.
Figure 11A:
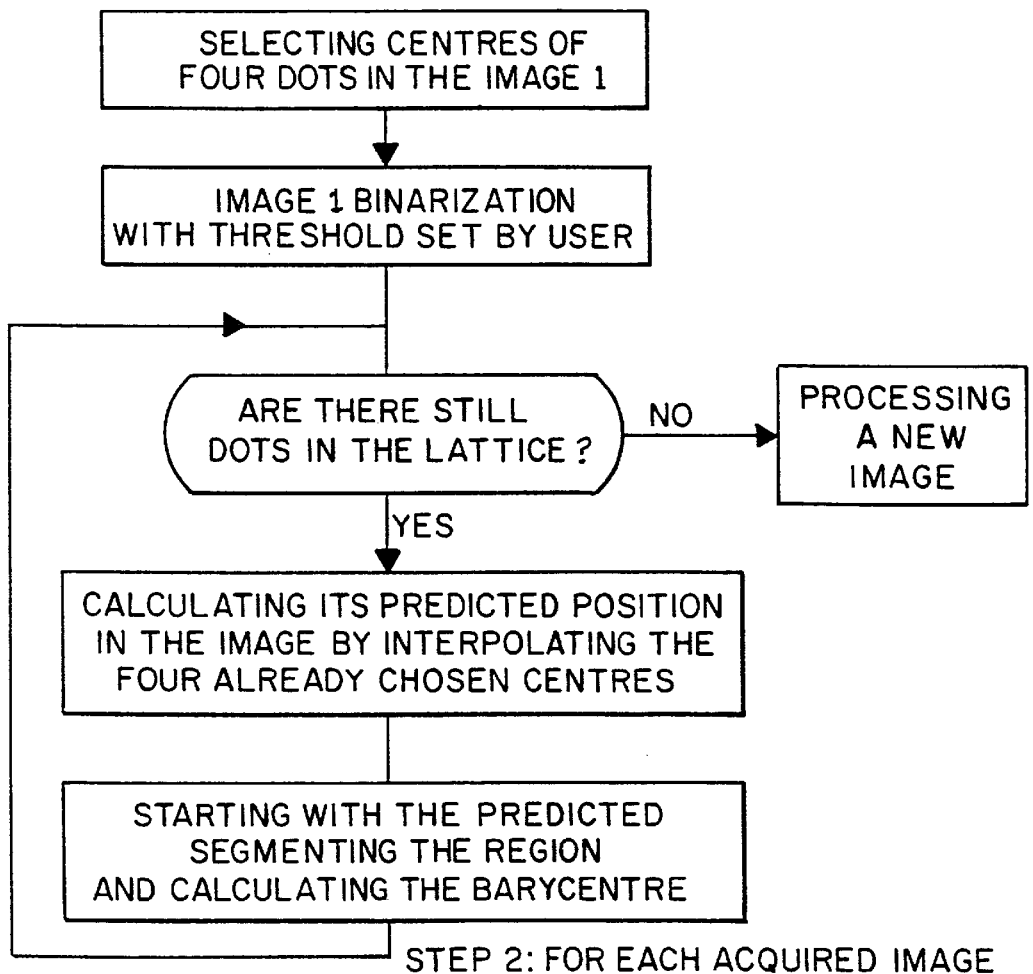
Figure 12:
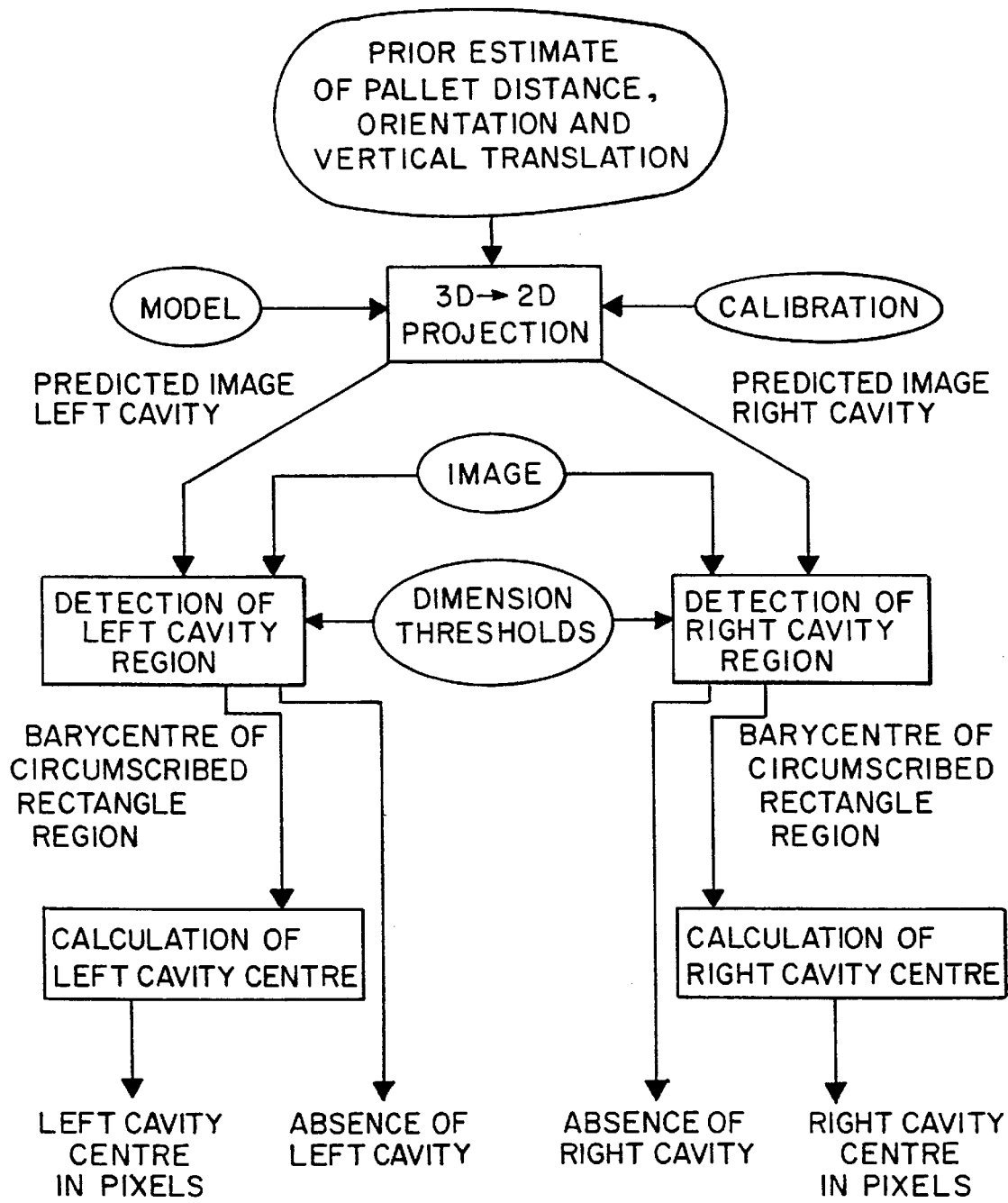
FIG. 12 is a block diagram of a first part of a procedure for identifying and estimating the position and orientation of a pallet.

Column 4 Line 66 "FIG. 11 is a flow diagram" should read
--FIGS. 11a and 11b are flow diagrams--.

Column 8 Line 5 "FIGS. 5-11" should read --FIGS. 5-11b--.

Column 16 Line 15 delete "white crosses on a black background" and insert --crosses--.

Signed and Sealed this

Eleventh Day of April, 2000

Attest:

Q. TODD DICKINSON

Attesting Officer

Director of Patents and Trademarks